United States Patent [19]

Oehlke

[11] Patent Number: 5,165,207

[45] Date of Patent: Nov. 24, 1992

[54] APPARATUS AND METHOD FOR FORMING A SPACE FRAME STRUCTURE

[76] Inventor: Harlan Oehlke, Rte. 1, Box 332-1, Charleston, W. Va. 25312

[21] Appl. No.: 824,517

[22] Filed: Jan. 23, 1992

[51] Int. Cl.⁵ .............................................. E04B 1/32
[52] U.S. Cl. ...................................... 52/81; 52/646; 403/244; 403/375
[58] Field of Search ...................... 52/80, 81, 82, 646, 52/648, 730, 716, 717; 403/375, 263, 244, 361; 439/883

[56] References Cited

U.S. PATENT DOCUMENTS

| | | |
|---|---|---|
| 7,567 | 3/1877 | DeForest ........................... 403/244 |
| 1,198,074 | 9/1916 | Sines ................................... 439/883 |
| 1,522,649 | 1/1925 | Platt ................................... 439/883 |
| 1,965,634 | 7/1934 | Fishel . |
| 2,037,736 | 4/1936 | Payne et al. . |
| 2,126,692 | 8/1938 | Whalton ............................ 403/244 |
| 2,225,972 | 12/1940 | Brogren . |
| 2,546,043 | 3/1951 | Parmenter . |
| 3,002,590 | 10/1961 | Hannoosh et al. . |
| 3,026,651 | 3/1962 | Richter . |
| 3,830,011 | 8/1974 | Ochrymowich . |
| 4,113,206 | 9/1978 | Wheeler ............................ 52/80 X |
| 4,296,585 | 10/1981 | Bini . |
| 4,313,696 | 2/1982 | Horten ............................ 403/344 X |
| 4,542,759 | 9/1985 | Kyner, Jr. . |
| 4,664,550 | 5/1987 | Jachmann et al. . |
| 4,715,160 | 12/1987 | Baker ................................ 52/81 |
| 4,950,186 | 8/1990 | Kaley et al. ..................... 439/883 X |
| 4,983,133 | 1/1991 | Van Scyoc et al. ............. 439/883 X |

Primary Examiner—Richard E. Chilcot, Jr.
Assistant Examiner—Creighton Smith
Attorney, Agent, or Firm—Beveridge, DeGrandi & Weilacher

[57] ABSTRACT

Structural components for forming a space frame, particularly a geodesic dome structure, as well as a method of assembling the structural components is described in this invention. The structural components feature a connector having a slotted tubular member which extends into a transition area which, in turn, extends into a planar spade section. A structural conduit is positioned so as to abut the spade section and includes an inwardly extending wedge shaped protrusion that extends into a V-shaped recess formed in the transition area to lock the structural conduit with respect to the connector. Thus, when the structural conduit is placed in a state of tension, the wedge shaped protrusion acts to increase the outside diameter of the slotted tubular member so as to increase the compression of the slotted tubular member with respect to the inside surface of the structural conduit. The connectors, together with the attached structural conduits, are arranged in a star-like fashion in groups having numbers such as five or six such that the structural conduits can be arranged to form a space frame such as a geodesic dome. Each spade section includes an enlarged aperture through which securement member extends and the spade sections are placed in a layered arrangement.

7 Claims, 4 Drawing Sheets

APPARATUS AND METHOD FOR FORMING A SPACE FRAME STRUCTURE

FIELD OF THE INVENTION

The present invention relates to structural components particularly suited for the formation of a space frame structure such as a geodesic dome structure and a method of assembling those structural components.

BACKGROUND DISCUSSION

In constructing space frame structures (i.e. a frame structure having a three dimensional arrangement), sought after qualities of the structural components include the following:

a) low cost from both a material and labor standpoint;

b) low weight which facilitates transporting and assembling;

c) high strength so as to make the space frame structure capable of withstanding various environmental conditions;

d) ease in assembling with common tools such as common household tools;

e) ease in constructing the structure with hand tools so as to allow for construction in remote areas which lack power sources for power tools;

f) ability to construct with local, off the shelf material; and g) the ability to achieve a wide variety of structure styles and a wide variety of structure sizes utilizing the same structural components.

One space frame structure which has received a large degree of notoriety is the geodesic dome structure as such a structure is both visually attractive and also capable of withstanding large external forces. A geodesic dome structure is constructed from a network of plane triangles built up to form a hemisphere.

U.S. Pat. No. 4,542,759 to Kyner, Jr., illustrates in FIG. 5 structural elements 2 being formed of tubular steel or aluminum and having flat ends 3 with drilled eyelets 4. Structural elements 2 are disclosed as being used for constructing geodesic shelters by connecting the structural elements in star-like fashion and locking the structural elements together by inserting a bolt through the axially arranged eyelets.

U.S. Pat. No. 2,225,972 to Brogren, illustrates in FIG. 6 interconnecting two links 17 by passing a bolt through connectors 54 and 58 plugged into the end of the hollow links 17. Links 17 are described as being used in the construction of an exposition tent.

U.S. Pat. No. 2,037,736 to Payne et al., illustrates in FIGS. 10 and 11 a truss assembly and connector. The truss assembly in FIG. 11 includes a plurality of wood beams held within joint members 50 with each joint member having extending bar 56 with eyelet 52 formed therein. A bolt is passed through the eyelets of the axially arranged joint members to interconnect the wooden beams. FIG. 10 also reveals that joint member 50 has a box-shaped base with one open end and one open side for receipt of the wooden beam.

U.S. Pat. No. 4,296,585 to Bini, shows in FIG. 3 the elements used to create the dome-shaped cover shown in FIG. 1. The dome-shaped structure is formed by coupling a plurality of interlocking connectors 6 releasably attached inside pipes 5. The connectors 6 are rod-like members with flattened ends having eyelets formed therein. The connectors are arranged vertically and a ring extends through the eyelets of a plurality of the connectors to form a star-shaped arrangement. While in a vertical position the connectors are secured in place between a bolt and washer. The releasable connection between connector body 6 and pipe 5 includes the formation of a circular recess in both elements and the addition of a cir-clip 8 to achieve the locking arrangement.

U.S. Pat. No. 3,026,651 to Richter, illustrates in FIGS. 11, 12, 16 and 17 the connection of planar structural elements 1 by arranging hub clamps 61, 62 and 63 such that their eyelets are aligned for receipt of a locking bolt.

U.S. Pat. No. 2,546,043 to Parmenter, illustrates a cluster connector for tie rods. The cluster connector includes rod securing members 6 with eyelets that pass around body member 3. Rod securing members 6 have internally threaded ends for receipt of the ends of threaded tie rods.

U.S. Pat. No. 3,830,011 to Ochrymowich, discloses a kit for forming various geometric structures, such as the geodesic dome shown in FIG. 1. Assembly of the geometric structures is achieved by inserting plastic hub connectors such as 20 shown in FIG. 11 into the end of hollow plastic tubes 12. The width of the hub connectors is greater than the plastic tubes such that, upon insertion of a hub connector into the end of a tube, the end of the tube is deformed into a flattened oval shape. This arrangement is described as enhancing the frictional contact between the tube and hub star connector.

U.S. Pat. No. 1,965,634 to Fishel, shows in FIGS. 3 and 4 assembly joints 24 which include slotted receiving sleeves 33 which extend about light rods 23 so as to lock the rods in place. The rods and assembly joints are connected together to form a tetrahedral kite.

U.S Pat. No. 4,664,550 to Jachmann, shows the interconnecting of rod-shaped structural element 7 with partial casing 2 by way of interlocking annular reinforcing rim 7 into grooves 2K formed in casing 2.

The foregoing prior art fail to provide structural components and a method for assembling the structural components which achieves a high satisfaction of each of the aforementioned qualities especially with respect to the formation of an intricate structural design such as a geodesic dome.

SUMMARY OF THE INVENTION

The present invention avoids the inadequacies of the prior art by providing components that are easily assembled into an intricate structure and which include all of the sought after qualities noted above.

Although the method and structural components are adapted for use in a variety of structures, the present invention is especially suited for use in constructing various dimensioned geodesic dome structures (e.g. greenhouses, screened enclosures, water proof rotundas and shelters). Accordingly, the following disclosure is made in reference to the preferred geodesic dome structure embodiment.

The present invention features a connector which includes a spade section having a lateral width and an aperture formed in a central region of the spade section. The spade section is essentially planar and includes an external end and an internal end.

The connector has a main body section which includes a tubular member having a first end, a second end, an upper portion, a lower portion, a first side portion and a second side portion. The main body further comprises a transition portion which extends externally off the first end of the tubular member and which is joined to the internal end of the spade section.

The transition portion is defined by a first edge which originates at a first contact point where the transition portion is joined to the spade section. The first edge slopes inwardly from this point in a direction away from the first side of the tubular member and towards the second side of the tubular member. The first edge also slopes towards the second end of the elongated conduit and in an upwardly direction from the lower portion of the tubular members towards the upper portion of the tubular member.

The transition portion is further defined by a second edge that originates at a second contact point where the transition portion joins with the spade section. The second transition edge slopes inwardly in a direction away from the second side of the tubular member and towards the first side of the tubular member. The second transition edge also slopes upwardly in a direction towards the second end of the tubular member and from the lower portion of the tubular member towards the upper portion of the tubular member. The first and second edges of the transition portion thus define a V-shaped recess.

The tubular member includes a slit or slot extending from the second end of the tubular member to the first end of the tubular member so as to open into the V-shaped recess and open out at the end of the tubular member. The slot is positioned in the upper portion of the tubular member essentially midway between the first and second sides of the tubular member, and the slot is defined by a first slot edge which continues off from the innermost point of the first edge of the transition portion (i.e., near the vertex area of the V-shaped recess). The slot is also defined by a second slot edge which continues off from the innermost point of the second edge of the transition portion towards the free end of the tubular member. The connector is formed so as to have a 60° vertex angle formed between a first ray extending from a center point of the aperture formed in the spade section to the first contact point and a second ray extending from the aperture center point to the second contact point. Thus, the edges of the slot on the tubular member run parallel from the second or free end of the tubular member towards the flattened spade end until the transition point or vertex region wherein the transition edges move apart forming the V-shaped recess. The transition edges eventually intersect tangentially with the circumference of the flattened spade section.

In a preferred embodiment the tubular member is circular in cross-section and the lateral width of the spade is greater than the length of a line extending between the first and second contact points. Also, the diameter of the tubular member is less than the length of the line extending between the two contact points and also less than the lateral width of the spade section.

The present invention features an assembly which is particularly suited for forming a geodesic dome. The assembly includes the aforementioned connector and a structural conduit having a first open end, an internal wall surface and an external wall surface. The tubular member of the connector has an external cross-sectional periphery equal to or less than the cross-sectional periphery of the internal surface of the structural conduit. Preferably the exterior diameter of the tubular member of the connector when not subjected to internal forces is slightly less (e.g., 1/16 inch to ⅛ inch) than the interior diameter of the structural conduit. For example, a preferred embodiment features a cylindrical tubular member having an exterior surface diameter that is about 1/16 of an inch less than the diameter of the interior of the surrounding structural conduit. The tubular member is positioned within the open end of the structural conduit and the lateral width of the spade is larger than a line extending between any two points lying on the cross-sectional periphery of the inner surface of the structural conduit (e.g. the inside diameter of a cylindrical structural conduit). The first end of the structural conduit includes a wedge shaped protrusion which extends inwardly and is received in the V-shaped recess formed in the connector such that the open front end of the structural connector is retained between the spade section and the vertex region of the V-shaped recess.

The connector is dimensioned for insertion into the open end of the structural tubing until contact is made by the end or lip of the structural conduit and the edge of the flattened spade section. When the structural conduit is in this position, the V-shaped recess is inside the end of the structural conduit. To lock the connector in place, the end or lip of the structural conduit is crimped down into the V-shaped recess of the connector.

A crimping tool or flaring tool can be used to deform the end of the structural conduit so as to have the wedge shaped protrusion extend deeply within the V-shaped recess and so as to have the interior end of the wedge in frictional contact with the edges in the vertex region of the recess. A tubing flaring is suitable for the purposes of the present invention. A number of various tools which are readily usable at the construction site without electricity can accomplish this operation. Suitable tools or devices include a specialized plier, a screw threaded flaring device or a hydraulic crimper and even a properly placed chisel struck by a hammer can accomplish the crimping operation. The latter being less desirable, however in view of the importance in having the correct dimensional relationship between the structural conduit and tubular member.

When the structural member is in compression, the end of the structural conduit pushes up against the spade section of the rigid connector assembly. When in tension, the crimped portion of the structural conduit front edge locks the connector inside the structural conduit. Not only does the crimped front edge prevent the connector from sliding out of the structural conduit, but it also tends to wedge the tubular member further apart as the connector tension increases. This further separation causes an expansion or increase in the outer diameter of the tube member which results in the outer diameter being compressed (or more greatly compressed if already in contact) up against the inside walls of the structural conduit. This increased internal friction adds to the strength of the connection between the connector and the structural conduit especially when the structure is subjected to high external force conditions (e.g. high winds).

The arrangement of the present invention is such that the length of the tubular member of the connector can be made relatively sort (e.g. 6 inches) due to the strength of the securing method of crimping the structural conduit into engagement with the tubular member. In most geodesic designs, the structural members are subject to primarily compression or tension forces and relatively small shear forces and thus the present invention is particulary suited for use in a geodesic dome structure.

The transition edges between the tube member and circular spade portion of a connector must be smooth along the edges to avoid any sharp radiuses that could initiate crack propagation. Also, as explained above, the tangent intersections (contact points) of the transition edges and spade section must be accomplished within a 60 degree arc projected form the bolt hole center point to allow up to six connectors to be bolted together without the transition areas interfering with each other. A line extending between the contact points also represents the location where bending is possible to enable the attached structural conduits to be angled off of the horizontal. The degree to which the structural conduits angle off of the horizontal is dependent upon the dimension and arrangement of the structure being assembled.

The connectors are preferably formed of galvanized steel $\frac{3}{4}''$ electric conduit or $1\frac{3}{8}''$ galvanized steel chain link fence tubing modified into the previously described design or preconstructed from sheet metal stampings rolled into the proper configuration. In choosing the material to be relied upon, consideration should be given to sheet metal gauge (thickness) or pipe thickness for strength, malleability for forming, and corrosion resistance.

The preferred assembly comprises a plurality of the connectors arranged in star-like fashion with the planar spade sections of the connectors being in a stacked relationship. The stacked spade sections are secured together with securement means. For example, a preferred embodiment features each spade section having a central aperture which are essentially aligned when the spades are in a stacked relationship. A securement member extends through the apertures in the stacked spades so as retain the spades in their stacked relationship.

When the assembly is used to construct geodesic domes groups of 5 and 6 connectors are arranged in star-like fashion.

The connectors and structural conduits are formed of a rigid material which is particularly suited for handling high tension and compression.

The present invention features a method for constructing basic structural components into an intricate structure such as a geodesic dome with the construction taking place entirely at the construction site.

The method includes positioning the tube members of a plurality of connectors into the open end of respective ones of a plurality of structural conduits. Since the lateral width of the spade section of each connector is greater than the lateral width of the open end of the structural conduits, the structural conduits are prevented from sliding past the spade end of the connector.

The open end of each of the structural conduits are deformed such that a segment of the open end of each of the structural conduits is received within the V-shaped recess formed in a respective one of said connectors. The deformation of the open end of the structural conduit results in each of the structural conduits being retained in position between the spade section and the slot provided in the associated connector.

A plurality of groups of connectors with associated retained structural conduits are arranged in star-like fashion such that the spade sections of each group of connectors are arranged in a stacked relationship.

The groups of spade section and associated connectors are joined together to form a plurality of structural segments (e.g. geodesic dome structural segments). The structural segments are then assembled to form sub-structures which are then assembled to form the completed structure such as a geodesic dome structure.

In deforming the open end of each of the structural conduits there is formed an inwardly extending wedge shaped protrusion which extends into the V-shaped recess so as to spread apart edges defining a slot formed in an associated tubular member. With this arrangement, the separation of the edges results in an expansion of the periphery of the associated elongated conduit into a more compressed state with respect to an overlying interior surface of the associated structural conduit. Also, when the structural conduits are further tensioned the wedge-shaped protrusion rides further within the slot so as to further expand the tubular member and further enhance the frictional securement with the structural conduit.

The step of fixing the spade section associated with each group of connectors together preferably includes inserting a bolt member through the apertures formed in the layered spades. The apertures have an approximate diameter of 1.25 times the diameter of the bolts for providing some leeway for underlength or overlength structural conduits. Thus, a significant amount of tolerance between the aperture's inside diameter and the bolt's outside diameter is provided for in the present invention to overcome any difficulties that may be encountered when bolting together the connectors due to inexact structural conduit lengths, etc. Large washers just slightly smaller than the spade portion diameter of the connectors should be used to gain added strength when bolting connectors together. Round head carriage bolts should also be used to reduce any difficulty in sliding fabric covering over structure.

The step of assembling a plurality of groups of connectors with associated retained structural conduits in star-like fashion includes forming groups of five and six connectors. The connector members are radially spaced so as to allow for easy construction of a geodesic dome structure or similar dome structure having hexagonal and pentagonal structural elements or sub-structures.

In a preferred method of assembling, five pentagonal sub-structures (comprised of 10 interconnected structural components) are formed and attached together at adjacent side peaks to form the "walls" of a geodesic dome. The two bottom vertices of the pentagonal sub-structure are attached to ground supports. A final pentagonal shaped sub-structure is raised and connected to the uppermost peaks of the five pentagonal sub-structure forming the walls of the dome. To keep the final pentagonal sub-structure as well as pentagonal "wall" sub-structures from bending too much from their center point, a support plate is bolted to an elongated bolt extending through the stacked spade members so as to limit the bending of the structural conduits too far from their assembly position during the lifting into place of the "wall" and final pentagonal sub-structures.

With this manner of attachment the assembled dome is well suited for handling a wide variety of environmental conditions. If an added degree of securement is deemed desirable, however, the present invention is easily adaptable to provide an added degree of securement. For example, in addition to the crimping of the end of the structural conduit into the V-shaped recess, it is also possible to utilize nut and bolt combinations extending down through the top of the structural conduit in the crimped region and through the tubular member and lower portion of the structural conduit.

Alternatively, or in addition thereto, a nut and bolt combination can be extending horizontally through the sides of the structural conduit and the sides of the tubular member rearward of the crimped region. Preferably holes are formed in the tubular member and structural conduits which are elongated slightly along the length of the conduit and tubular member so as to allow for some interplay and adjustment capability between the structural conduit and tubular member. Also, the adjustment capability allows for the protrusion to expand the edges of the slot into greater compression with the structural conduit. Washers having diameters larger than the width of the elongated slots are also preferably relied upon.

The manner of assembling the structural components includes positioning a tube member in a structural conduit, deforming the open end of each of the structural conduits, arranging a plurality of groups of connectors, stacking and fixing the spade connectors and assembling the structural segments into structural sub-structures and then into the completed structure. All of these construction steps can be carried out at the construction site (e.g. 50 yards around the building location) without the need for power tools and with off-the-shelf material.

DETAILED DESCRIPTION OF THE INVENTION

Figure 1:
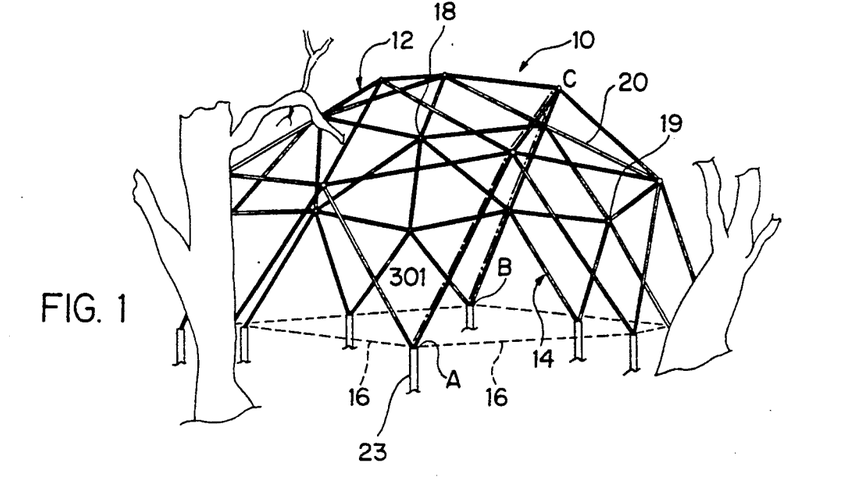
FIG. 1 illustrates a space form structure formed of the structural components of the present invention.

FIG. 1 illustrates a space frame 10 formed in the shape of a geodesic dome. Geodesic dome 10 includes a hemispherical main body 12 formed of a plurality of interconnected structural frame segments 14 as well as an optional, essentially circular base structure 16 (shown in dashed lines). Each structural frame segment 14 includes a central apex (18, 19). Frame segments 14 further include a plurality of beams 20 which extend between adjacent apexes. Apex 18 designates an apex having 6 beams extending radially out therefrom and apex 19 designates an apex having 5 beams extending radially out therefrom.

Figure 2:
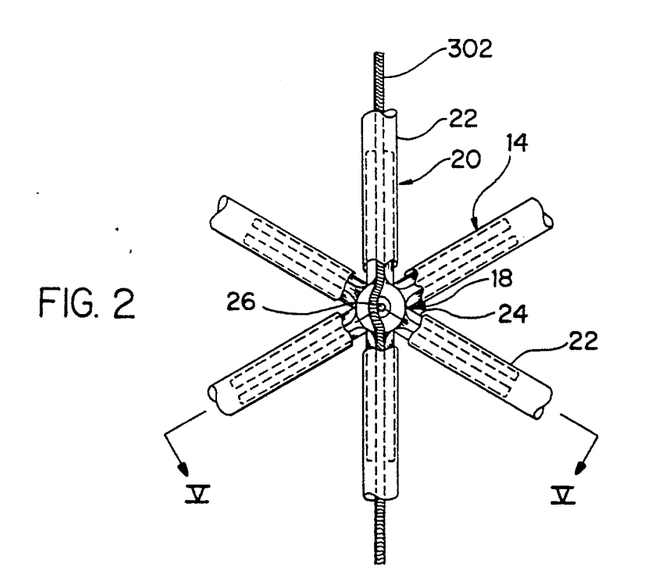
FIG. 2 provides a cut-away view of one of the apexes shown in FIG. 1.

FIG. 2 illustrates one of the frame segments 14 shown in FIG. 1 having six radially extending support beams 20. Support beams 20 are each radially spaced from one another. Planes containing the structural members' centerlines intersect along the securing bolt members' centerline at 60° and 72° angles. Within a plane containing two adjacent structural members, angles will differ according to structural members' lengths.

Each support beam 20 includes a structural conduit 22. Structural conduits 22 can be formed of any material having sufficient structural rigidity. Preferably, structural conduits 22 are formed of cylindrical piping that is readily available (e.g., off the shelf) stock such as 0.5 to 1.5 inch (preferably 1 ⅜" inch) galvanized steel chain line fencing pipe or 0.5 to 1.0 inch (preferably 0.75 inch) galvanized steel electrical conduits.

FIG. 1 illustrates, schematically, a geodesic dome structure formed of 0.75 inch galvanized steel electric conduits with the longest lengths being about 10 feet. Through use of electrical conduits having a maximum length of 10 feet and some being slightly shorter (~8'10"), dome 12 can be formed so as to have about a 33 foot diameter and a 20 foot center height, with the center height including the 3 feet above surface length of support posts 23. Thus, with 8 feet 10 inches and 10 feet long conduits 20, a dome can be formed having approximately 850 square feet of closed area. Fabric covering can then be secured over the structure so as to provide a rain proof picnic area, greenhouse, wedding reception area, etc. Varying the lengths of the structural members will result in domes with different height/diameter profiles. However, the connectors and securing methods will remain the same.

FIG. 2 further illustrates that each support beam 20 features a connector 24 received within the end of a structural conduit 22 and extending towards a common point 26 to form apex 18.

With reference now to FIGS. 2, 3, 4 and 5, connectors 24 are shown to have an elongated tubular member 28 with first end 30 and second end 32. Extending off of end 32 is transition portion 34 and extending off from transition portion 34 is spade section 36.

Figure 3:
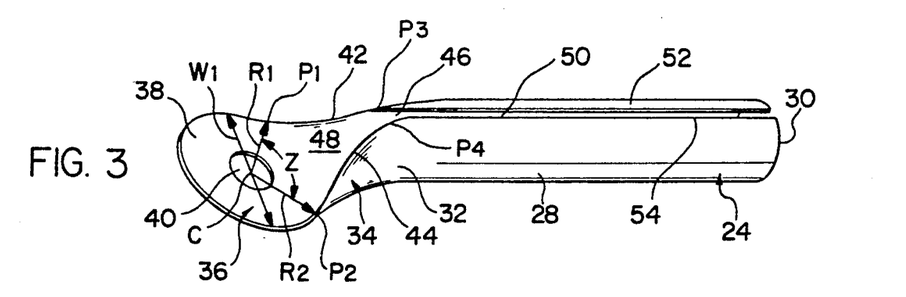
FIG. 3 illustrates in greater detail the connector member of the present invention.

Spade section 36 features a planar, nearly complete cylindrical member 38 having a central aperture 40 formed therein.

Transition area 34 includes first transition edge 42 and second transition edge 44. Transition edge 42 is tangent with respect to contact point P1 of the cylindrically shaped spade member 38. Transition edge 42 slopes inwardly and upwardly from point P1 towards central region 46 of elongated tubular member 28. Second transverse edge 44 represent a mirror image of transverse edge 42 and thus slopes inwardly and upwardly from contact point P2 towards central region 46. For reference, a pair of rays R1, R2, are shown extending from center C of aperture 40 and spaced apart at angle Z. In a preferred embodiment of the invention, angle Z is 60°. In this way, there is achieved a maximum amount of integration between the end of transition area 42 and the internal portion of spade member 38, while still allowing for up to 6 connectors to be radially spaced about securement means (discussed in further detail below) which hold spade members 38 in a stacked relationship.

Transverse edges 42 and 44 define a V-shaped recess 48 and slot 50 is shown extending away from V-shaped recess 48 and from second end 32 to first end 30 of tubular member 38. Slot 50 includes first slot edge 52 and second slot edge 54. First slot edge 52 represents a continuation of first transition slot 42 while second slot edge 54 represents an extension of second transition edge 44. Preferably, tubular member 28 is cylindrical and slot 50 represents about 1 to 5% of the total circumference of tubular member 28 when tubular member 28 is in a preassembled state. For rather large structures, the outer diameter of tubular member 28 while in this state is preferably $1\frac{1}{8}$ to $1\frac{1}{4}$ inches.

As illustrated in FIG. 3, the maximum lateral width of spade member 38 is W1. Width W1 is greater than the length between points P1 and P2 with the latter being greater than the outside diameter of cylindrical tubular member 28. FIG. 3 also shows points P3 and P4 as representing a transition point between the respective transition edge and slot edge.

Referring again to FIG. 3, a preferred embodiment of the connector features a connector having spade width W1 at about $2\frac{1}{8}$ inch, aperture 40 at about $\frac{3}{4}$ inch or, in an alternative embodiment, which originates from $1\frac{3}{8}$ diameter stock $W_1$ is 3 inches and aperture 40 is $1\frac{3}{8}$ inches in diameter. Also, the horizontal distance from midway between transition points P3 and P4 to an intersection with a vertical line extending through center point C of aperture 40 is preferably about $2\frac{1}{8}$ inches or about 3" for the embodiment originating from the $1\frac{3}{8}$ diameter stock. The length of tubular member 28 extending between first end 30 and second end 32 is preferably a minimum of $2\frac{1}{2}$ inches or 3" for the embodiment originating from $1\frac{3}{8}$ inch stock. Furthermore, the outside diameter of cylindrical tubular member 28 is preferably (when in a non-tension state) essentially equal to or slightly less than the inside diameter of structural conduit 22. Also, for purposes to be explained in greater detail below, tubular member 28 is formed with a relatively thin (e.g. $\frac{1}{8}$ inch to 1/16 inch) cross-sectional thickness.

Connector 24 can easily be formed from an unsplit cylindrical tube. In other words, a plurality of connectors can be formed from a single or a few lengths of cylindrical tubular piping. Such piping is cut to the appropriate length (e.g. 6 inches) which connector 22 is to have. Thereafter, a slit is formed along the entire length of the cut section of tubular piping. This slit can be formed by any suitable means including a power saw or, more preferably for remote areas, metal shears and the like. One end of the split tube is then pounded into a planar member through the use of any suitable means such as a hammer and an anvil. The planar member represents the spade section of the connector and to avoid sharp edges, the planar section is preferably cut with the metal shears so as to form the cylindrical shape shown in FIG. 3. A hole can then be punched through the center of the planar spade section so as to form aperture 40. The formation of the planar spade section results in essentially the natural formation of transition area 34. Adjustments can be made with pliers or the like to compensate for any deviation from the desired transition area shape. It should be noted that connector 22 can easily be formed from off the shelf piping without the requirement of power tools which can be important in attempting to assemble a geodesic dome in a remote area where a power source is not readily available.

Figure 4:
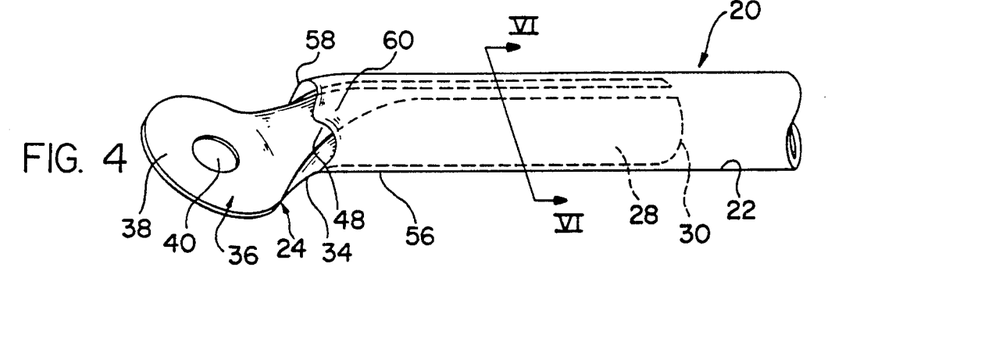
FIG. 4 is a partially cut-away view of the connector member received within the open end of a structural conduit.

FIG. 4 illustrates connector 24 in a fixed relationship with structural conduit 22. As shown in FIG. 4, connector 24 is received within the open end of structural conduit 22. Preferably, the outside diameter of tubular member 28 of connector 24 is about equal to or slightly less (e.g., 1/16 to $\frac{1}{8}$ of an inch) than the inside diameter of structural conduit 22 such that a snug relationship exists between tubular member 28 and structural conduit 22.

Figures 7, 8:
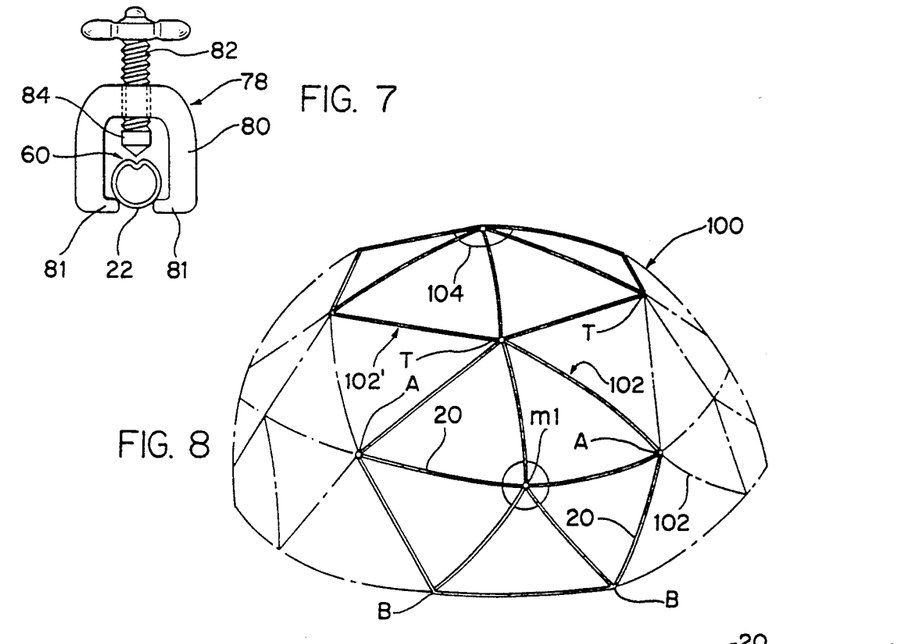
FIG. 7 illustrates a flaring tool suitable for use in the present invention.
FIG. 8 illustrates a geodesic dome structure formed from preferred sub-structure assemblies.

The front end 56 of structural conduit 22 includes front edge or lip 58. Front end 56 includes a wedged shaped inwardly extending protrusion 60 which is received within V-shaped recess 48. Wedge 60 is preferably formed with a crimping or flaring tool. FIG. 7 illustrates flaring tool 78 with yoke 80 having inwardly extending flanges 81 separated by a distance less than the diameter of structural conduit 22. Yoke 80 receives screw threaded crimping member 82 with head 84.

The size of wedge 60 is such that frictional contact exists between the internal end of wedge 60 and the front end portion of slot edges 52 and 54 near transition points P3 and P4. This frictional contact acts to increase the slot distance (and provide a change in percentage of circumference) such that the outside diameter of tubular member 28 expands to as to initially come in frictional contact with the inside diameter of structural conduit 22 or to come in greater frictional conduit therewith. Front edge 58 of structural conduit 22 is also in contact with a portion of connector 24 forming transition area 34. In this way, structural conduit 22 is prevented from moving forward (away from tubular member 28 and towards spade member 38) due to the abutment with the transition area. Also, width W1 of spade member 38 is made so as to prevent the sliding of structural conduit 22 past spade member 38 even during excessive thermal expansion, high wear conditions, or anticipated deformation of front end 56 of conduit 22.

Wedge 60 and its relationship with connector 22 also provides the unique feature of providing additional structural stability during situations when high tension forces are placed on structural conduits 22 (e.g. high wind conditions). When one of structural conduits 22 is placed in a high state of tension, it is drawn away from spade member 38 and towards end 30 of tubular member 28. During such an occurrence, wedge shaped member 60 which has a surface that diverges in a forward direction, acts to further separate the slot edges such that the outside diameter of tubular member 28 further increases so as to further compress against the inside diameter of structural conduit 22.

Figure 6A:
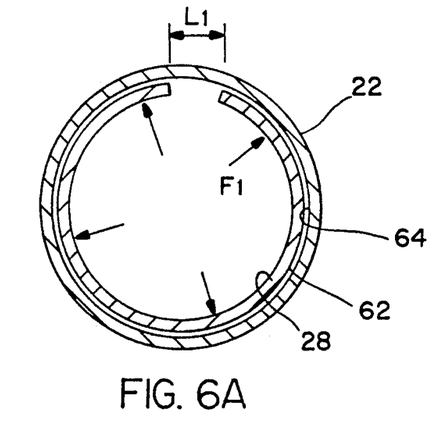
FIG. 6a represents a cross-sectional view taken along cross-section line VI—VI in FIG. 4.
Figure 6B:
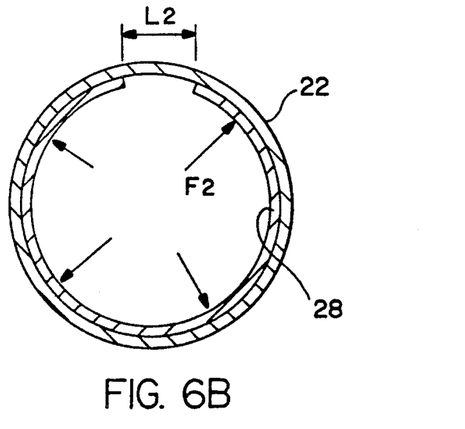
FIG. 6b illustrates that which is shown in FIG. 6a following an increase in tension on the structural conduit.

This advantageous feature of the present invention is illustrated in FIG. 6a and 6b. FIG. 6a illustrates the relationship between tubular member 28 and structural conduit 22 when structural conduit 22 is not tensioned by external factors. As previously discussed, the outside surface 62 of tubular member 28 is preferably equal to or slightly less than the inside surface 64 of structural conduit 22. Although more difficult to assemble and thus less preferred, the spring like nature of the thin-walled connector member allows for the possibility of having the outside diameter of the slotted tubular member 28 even larger than the inside diameter of structural conduit 22 (e.g. 1/16 inch). In this way, connector 22 is compressed by decreasing the slot space and inserting tubular member 28 into the front end of conduit 22. Once inserted, tubular member 28 would snap back into contact with the inside diameter of structural conduit 22. Preferably, however, the outside diameter of surface 62 is made equal to or slightly less than the inside diameter of surface 64 such that connectors 22 can be quickly inserted into the front end of structural conduits 22 without the added step of compression.

FIG. 6a also illustrates slot space L1 as well as the inherent expansion force F1 for the resilient tubular member 28. The outside diameter of tubular member 28 is shown slightly less (e.g., 1/16 to ⅛ inch less) than the insider diameter of structural conduit 22.

FIG. 6b illustrates the arrangement of tubular member 28 with respect to conduit 22 when structural conduit 22 is placed in a tension state. As noted above, when structural conduit 22 is placed in a tension state, the divergent wedge 60 rides into the front portion of slot 50 so as to further separate the slot edges to achieve a slot spacing of L2. With L2 greater than L1, tubular member 28 is further compressed against the inside surface of structural conduit 22 (e.g., F2 greater than F1) such that the frictional contact between tubular member 28 and conduit 22 is increased at a time when such an increase is desirable.

The present invention also provides a novel means for enhancing the structural strength of the frame structure. In the space frame structure depicted in FIG. 1, some structural tubing will lie in common plane 301 depicted by dashed lines. As shown, common plane 301 extends from support post A, crests at C and terminates at support post B positioned opposite post A. Any two opposing posts and corresponding structures will form a similar common plane of structural tubing or conduits. The means for enhancing the structural strength of the space frame structure includes cable 302 which is threaded within the structural tubing between opposing support posts A and B and along plane 301. Similar cable wires are also preferably provided between other opposing support posts (or the supporting ground structure). In a preferred embodiment, a steel cable (e.g., ¼" or ⅜") is secured to support post A, threaded through a plurality of structural tubings lying along plane 301, and secured to the opposite end of the cable to support post B.

FIG. 2 shows cable 302 threaded through substantially diametrically opposed structural conduits 20 and past one side of common central point 26. The arrangement and design of structural conduits 20 and connectors 24 allows for easy threading of cable 302. For example, the shape of the connectors allows for easy threading of the cable along the common plane either before or after final assembly. The added strength provided by cable 302 is most beneficial when the structure is subjected to harsh environments such as high wind or extreme temperatures. In such an environment, it is possible for bolts or the like to break or for hurled objects to damage the structure. The enhanced support provided by the cable arrangement of the present invention allows for even broken sections of the space frame to retain their structural integrity.

Rather than the above described metallic piping, the present invention also contemplates the use of plastic piping such as off-the-shelf PVC piping. Crimping of the PVC pipe can be accomplished with a flaring tool together with localized heating such as with an electric heating device or an open flame if the area is remote (e.g. propane burner).

Figure 5:
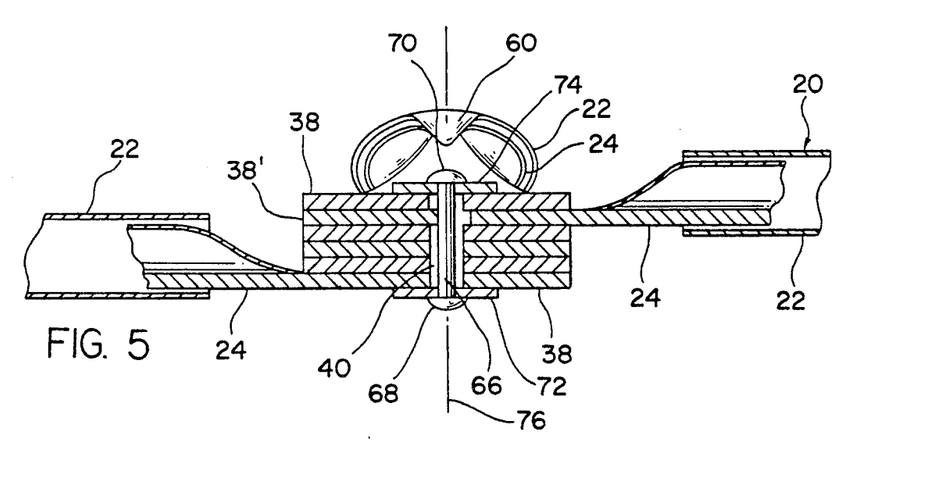
FIG. 5 represents a cross-sectional view taken along cross-section line V—V in FIG. 2.

Referring now to FIGS. 2 and 5, there is illustrated the manner of connecting beams 20 so as to maintain the star-like arrangement shown in FIG. 2. As shown in FIG. 5, spade members 38 for each of connectors 24 are arranged in a stacked relationship. Extending through the essentially aligned apertures 40 is bolt 66. Bolt 66 has a diameter that is about 80% of the diameter of aperture 40. This difference between the diameter of aperture 40 and the diameter of bolt 66 allows for more tolerance freedom with respect to the length of support beams 20 extending between adjacent apexes. For example, as shown in FIG. 5, spade member 38' is shifted into contact with bolt 66. This shifting is the result of support beam 20 having been formed of a length slightly less than the predetermined value assigned for a normal length support beam 20 which can be expected at an on-site construction. Also, such shifting allowance also allows for thermal expansion and contraction of the beams.

Bolt 66 includes grounded heads 68 and 70 which are smooth so as to prevent snagging with any material placed over space frame 10. FIG. 5 also illustrates cylindrical washers 72 and 74 which have holes formed therein that are essentially equal in diameter to the diameter of bolt 66. The outside diameter of washer 72 and 74 is at least 2.5 times greater than the diameter of aperture 40 such that spade members 38 are retained in the stacked relationship shown in FIG. 5 despite any shifting in spade members 38 with respect to the central axis of bolt 66.

Figure 9:
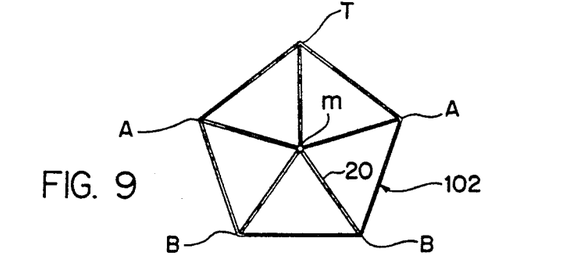
FIG. 9 shows one of the preferred sub-structure assemblies of FIG. 8.

FIG. 8 schematically illustrates geodesic dome structure 100 formed using a preferred method of the present invention. Geodesic dome structure 100 is comprised of six pentagonal shaped sub-structure assemblies 102 some of which are shown in ghost-line to help in distinguishing between the sub-structure assemblies. In assembling geodesic dome structure 100 six sub-structure assemblies 102 are individually assembled. As shown in FIGS. 8 and 9 each sub-structure assembly includes five support beams 20 extending from central point M in star-like fashion. Five additional support beams are joined to the ends of the support beams 20 extending from central point M so as to provide a pentagonal shape to the outer periphery of each sub-structure assembly.

Five of the six sub-structure assemblies 102 are joined at adjacent lateral most points A to create the "side" wall of the dome structure 100. Attachment at point A is easy for the assembler or assemblers as it is at a relatively low height. Bottom peaks B are secured to appropriate support such as the ground or to posts or a foundation extending off from the ground. The final "roof" pentagonal sub-structure assembly 102 is lifted into position such as by a pole, pulley and rope assembly (not shown). However, to prevent an undue amount of bending in support beams 20 about center M, a limiting member 104 is provided. Limiting member 104 can be provided on each sub-structure assembly, but it is preferable to use limiting member 104 especially with roof assembly 102' which is subject to the greatest bending loads during positioning.

Figure 10:
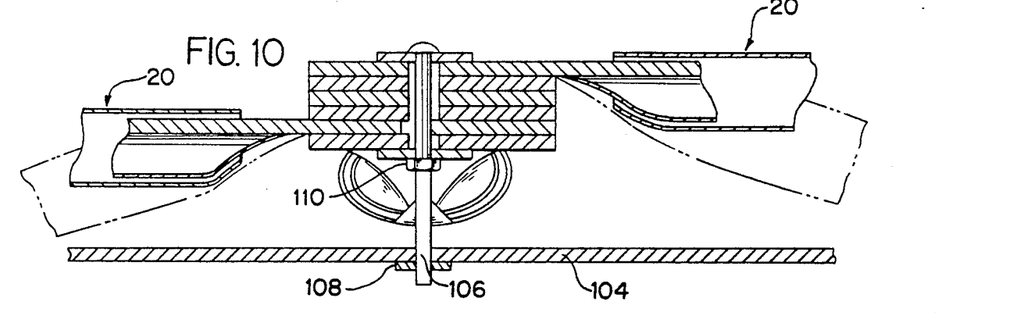
FIG. 10 shows a cross-sectional view similar to that of FIG. 5 together with a limiting member.

FIG. 10 shows the connection of support beams 20 which is similar to that which is shown in FIG. 5 except for the addition of plate 104, the use of modified central bolt 106 and nuts 108 and 110. Extended central bolt 106 extends through a central aperture in plate 104 and nut 108 locks plate 104 in the desired axial position along bolt 106. Bolt 110 is used to clamp spades 38 as was done in FIG. 5. Plate 104 is preferably a circular plate having a diameter of 10 to 12 inches.

FIG. 8 shows in ghost-lines support beams 20' in a bent position which is close to the final assembly position of support beams 20. Plate 104 acts to prevent undue bending in support beams 20 especially when the roof sub-structure 102' is raised into position. Through adjustment of bolt 108 the degree of bending prevention can be adjusted.

Figure 11:
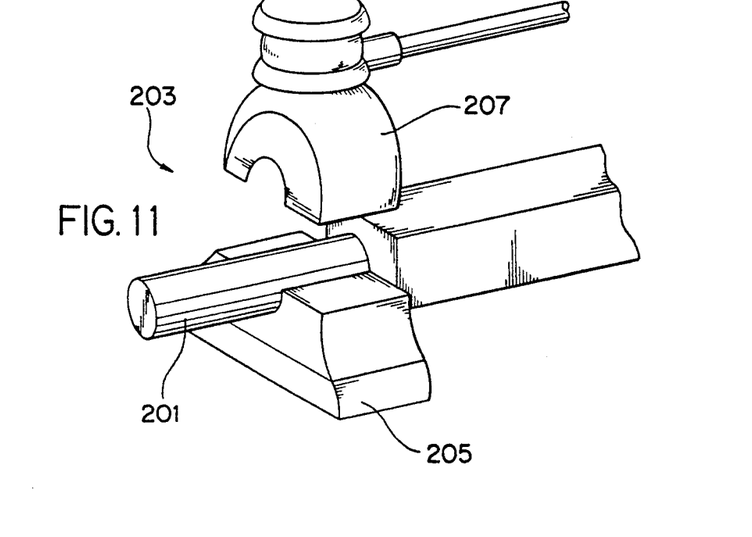
FIG. 11 shows a pipe section being swaged in a swaging die set.
Figure 12:
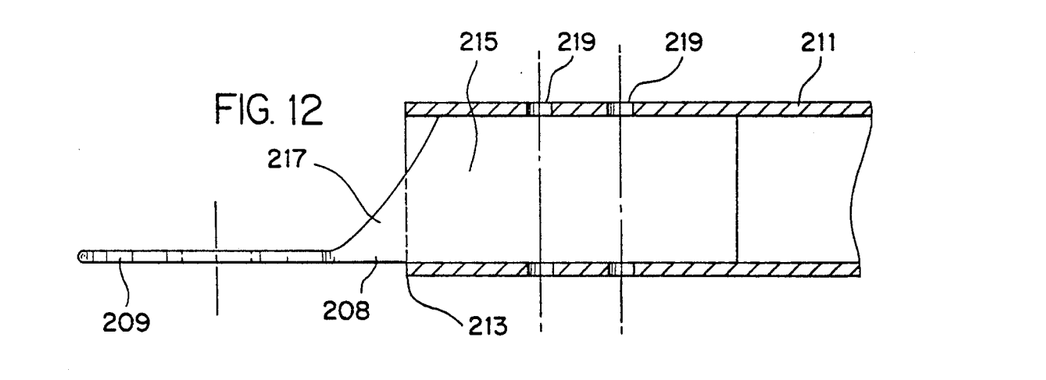
FIG. 12 shows an elevational, partly cut-away side view of the swaged pipe section following formation of the flat extension and insertion into the structural conduit.
Figure 13:
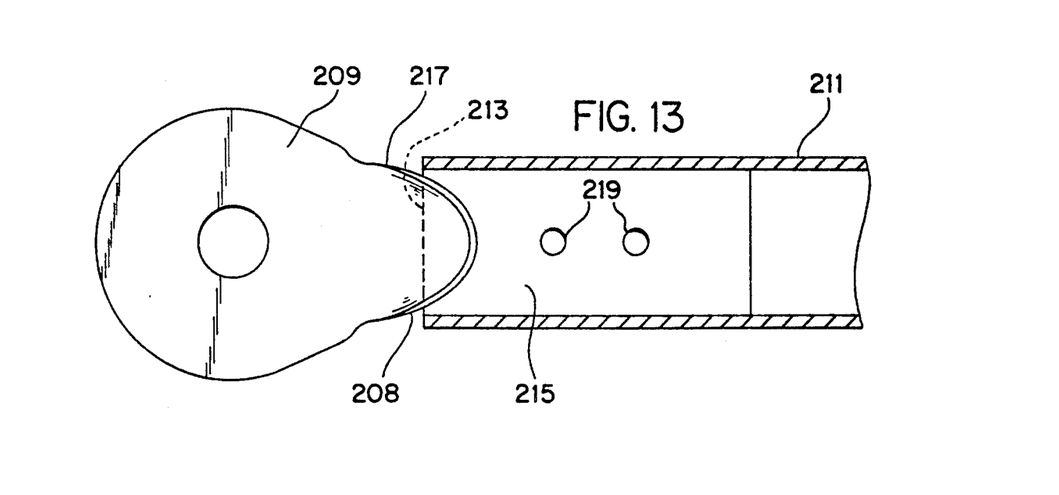
FIG. 13 shows a partially cut-away, top plan view of that which is shown in FIG. 12.

FIGS. 11-13 show an alternate embodiment of the present invention. FIG. 11 shows pipe section 201 in position within swaging assembly 203. Swaging assembly 203 includes die sections 205 and 207 which when forced into contact (e.g., by the blow of a hammer) will deform a portion of pipe section so as to have a somewhat lesser diameter than the portion of the pipe section not received in the die sections. The swaging step can be carried out with or without localized heating of pipe section 201. Following the swaging operation, larger diameter portion 208 of the pipe section is cut and formed so as to include flat extension 209. Structural conduit 211 is formed from the remainder of a pipe from which pipe section 201 is cut. The swaging operation is conducted such that the outside diameter of the swaged end of the pipe section is snugly received by the interior surface of the structural conduit. The rim of structural conduit 211 is slid into contact with portion 213 of pipe section 201 which separates swaged portion 215 from unswaged portion 217. To secure structural conduit 211 to pipe section 208 suitable fastening means such as bolts can be inserted through holes 219 or an alternate crimping operation may be relied upon.

Although the present invention has been described with references to preferred embodiments, the invention is not limited to the details thereof. Various substitutions and modifications will occur to those of ordinary skill in the art, and all such substitutions and modifications are intended to fall within the spirit and scope of the invention as defined in the appended claims.

What is claimed is:

1. An assembly for forming a space frame, comprising:
    a connector which includes a spade section and a main body section, said main body section including a tubular member and a transition portion extending between said spade and said tubular member, said transition portion being defined by first and second edges which slope inwardly and upwardly to define a V-shaped recess, and said tubular member having a slot formed therein which opens into the V-shaped recess and extends away from the V-shaped recess towards a free end of said tubular member; and
    a structural conduit having a first open end, a front edge defining said open end, an internal wall surface and an external wall surface, said tubular member being positioned within the open end of said structural conduit, the lateral width of said spade being larger than a line extending between any two points lying on the front edge of said structural conduit, and the first end of said structural conduit including a V-shaped protrusion which is received in the V-shaped recess formed in said connector such that the open front end of said structural conduit is retained between said spade and a vertex region of said V-shaped recess, and, upon a tensioning of said structural conduit, said tubular member expands in cross-section so as to compress against the inner surface of said structural conduit.

2. An assembly as recited in claim 1 further comprising a plurality of said connectors arranged in star-like fashion with the planar spade sections of said connectors being in a stacked relationship, and said assembly further comprising securement means securing said spades in the stacked relationship.

3. An assembly as recited in claim 2 wherein said spade sections each include a central aperture and are arranged in a stacked relationship when said connectors are arranged in star-like fashion, said securement means including a securement member adapted to extend through the central apertures, and said first edge defining said transition portion originates from a first contact point where said transition portion contacts said spade section and said second edge defining said transition portion originates from a second contact point where said transition portion contacts said spade section, and said securement member having a central axis and each of said connectors being dimensioned and arranged such that about a 60° angle is formed between a line extending from said central axis to said first respective contact point and a line extending from said second respective contact point.

4. An assembly as recited in claim 1 further comprising a plurality of said connectors and said attached structural conduits arranged in star-like fashion and wherein each of said spade sections include a central aperture and said securement means includes a member which is adapted to extend through the central aperture of a plurality of spade sections in a stacked relationship and said securement member having a diameter which is about 80% of the diameter of the central aperture.

5. An assembly as recited in claim 1 wherein said structural conduit is cylindrical and the lateral width of said spade section is greater than the diameter of said structural conduit.

6. An assembly as recited in claim 1 wherein said slot extends from one end of the tubular member and opens out at the other end.

7. An assembly as recited in claim 1 further comprising securement means and a plurality of said connectors and said attached structural conduits being arranged in star like fashion with said connectors secured by said securement means in a stacked relationship, said securement means including an extended member extending away from said connectors, and said assembly further comprising a limiting plate member and fixing means for fixing said limiting plate member a predetermined distance away from said connectors so as to provide for a limited degree of angling away from a horizontal plane in the structural conduits attached to said connectors prior to abutment with said limiting plate member.

* * * * *